United States Patent
Blossom et al.

(10) Patent No.: US 7,443,965 B2
(45) Date of Patent: Oct. 28, 2008

(54) INTEGRATED VOICE AND DATA INTEROPERABILITY PLATFORM

(75) Inventors: Kent L. Blossom, Wilmington, NC (US); George Forshay, Waxhaw, NC (US); Louis Charles Foss, Frederick, MD (US); Paul E. Leuba, Hunt Valley, MD (US); Tapas K. Som, Germantown, MD (US); John C. Wyatt, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 1125 days.

(21) Appl. No.: 10/605,925

(22) Filed: Nov. 6, 2003

(65) Prior Publication Data

US 2005/0099995 A1  May 12, 2005

(51) Int. Cl.
*H04M 1/64* (2006.01)

(52) U.S. Cl. .............................. 379/88.25; 379/265.09; 370/352; 709/231; 715/210

(58) Field of Classification Search .............. 379/88.22, 379/88.25, 265.09; 719/331; 370/352; 709/231; 715/210
See application file for complete search history.

(56) References Cited

U.S. PATENT DOCUMENTS

| | | | |
|---|---|---|---|
| 5,867,494 A | 2/1999 | Krishnaswamy et al. | |
| 5,867,495 A | 2/1999 | Elliott et al. | |
| 5,999,525 A | 12/1999 | Krishnaswamy et al. | |
| 6,058,435 A * | 5/2000 | Sassin et al. ................. | 719/331 |
| 6,081,518 A | 6/2000 | Bowman-Amuah | |
| 6,147,975 A | 11/2000 | Bowman-Amuah | |
| 6,195,697 B1 | 2/2001 | Bowman-Amuah | |
| 6,335,927 B1 | 1/2002 | Elliott et al. | |
| 6,345,239 B1 | 2/2002 | Bowman-Amuah | |
| 6,400,996 B1 | 6/2002 | Hoffberg et al. | |
| 6,426,948 B1 | 7/2002 | Bowman-Amuah | |
| 6,427,132 B1 | 7/2002 | Bowman-Amuah | |
| 6,442,547 B1 | 8/2002 | Bowman-Amuah | |
| 6,449,588 B1 | 9/2002 | Bowman-Amuah | |
| 6,542,593 B1 | 4/2003 | Bowman-Amuah | |
| 6,556,659 B1 | 4/2003 | Bowman-Amuah | |

\* cited by examiner

*Primary Examiner*—Gerald Gauthier
(74) *Attorney, Agent, or Firm*—Gibb & Rahman, LLC (57) ABSTRACT

Disclosed is a communication server that includes a message transfer unit that transfers messages sent between a first user communicating under a first communication system and a second user communicating under a second communication system. For example, the communication systems could each comprise a plurality of mobile wireless transceivers and a plurality of land-based transceivers that are used by emergency-response organizations. These communication systems may be incapable of communicating directly with each other. The communication server also includes a translator connected to the message transfer unit. The translator translates messages sent from the first communication system into a format compatible with the second communication system and vice versa. The communication server also has a voice-over-Internet-protocol (VoIP) unit connected to the message transfer unit, so that messages are transmitted through the communication server in a VoIP format. Thus, messages are transferred between the communication systems using discrete Internet protocol addresses.

27 Claims, 4 Drawing Sheets

INTEGRATED VOICE AND DATA INTEROPERABILITY PLATFORM

GOVERNMENT RIGHTS

This invention was made with Government support under Contract Number 2001RBCXK001 awarded by the National Institute of Justice. The Government has certain rights in this invention.

BACKGROUND OF INVENTION

The present invention generally relates to communications between agencies that utilize potentially incompatible communication systems and more particularly to a communication coordination system that provides both voice and data communications between such agencies.

Government agencies at all levels are grappling with how to coordinate and respond to public safety incidents. In recent years this problem has been acknowledged, but given relatively low priority. Since Sep. 11, 2001, this need for interoperability has become urgent. Traditionally, these agencies independently acquire communications technology designed primarily for intra-agency communications. Consequently, when units from different first responder organizations respond to the same incident, they are often unable to communicate directly with one another over their incompatible, different communication networks and systems. The invention discussed below provides a solution that allows these different communication networks to communicate effectively using both voice and data.

SUMMARY OF INVENTION

The invention provides a communication server that includes a message transfer unit that transfers messages sent between a first user communicating under a first communication system and a second user communicating under a second communication system. Each of the incompatible communications systems may include wired and wireless components. For example, the communication systems could each comprise a plurality of mobile wireless transceivers and a plurality of land-based transceivers that are used by emergency-response organizations. These communication systems may be incapable of communicating directly with each other.

The communication server may also include a translator connected to the message transfer unit. The translator translates messages sent from the first communication system into a format compatible with the second communication system and vice versa.

The communication server also has a voice-over-Internet-protocol (VoIP) unit connected to the message transfer unit, so that messages are transmitted through the communication server in a VoIP format. Thus, messages are transferred between the communication systems using discrete Internet protocol addresses.

A voice/data converter can be included with the communication server. The voice/data converter is used to convert voice messages into data messages and data messages into voice messages. Thus, with the invention, a voice user in the first communication system may transparently communicate with a data user in the second communication system (and vice versa) through the communication server. Additionally, the communication server can provide an instant messaging unit that allows instant messaging between the communication systems.

The communication server can include a registration unit that associates users of multiple incompatible communication systems. This allows the invention to restrict communications between the users by incident and by registration.

Using this system, the invention presents a method of providing communications between different communication systems. The invention connects the first communication system and the second communication system to the communication server and translates messages sent from the first communication system into a format compatible with the second communication system and vice versa, using the communication server. Again, the invention transmits voice messages between the first communications system and the second communications system through the communication server in a voice-over-Internet-protocol VoIP format using discrete Internet protocol addresses.

The invention can translate voice messages to data messages and data messages to voice messages. Thus, as explained above, a voice user in a first communication system may transparently communicate with a data user in the same or a second communication system through the communication server. The invention can also send instant messaging between the first communication system and the second communication system so as to provide real-time communication between users of the different communication systems.

The invention can restrict communications between users of multiple communication systems by incident and by those users who have associated themselves with a specific incident. In such a situation, the invention first identifies the incident and then associates at least one user of a first communication system and at least one user of a second communication system with the incident. Then, the invention connects the first user and the second user to the communication server and translates messages sent from the first user's communication system into a format compatible with the second user's communication system and vice versa.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF DRAWINGS

The invention will be better understood from the following detailed description with reference to the drawings, in which.

DETAILED DESCRIPTION

As mentioned above, when units from different first responder organizations respond to the same incident, they are often unable to communicate directly with one another over their incompatible, different communication networks and systems. To address this problem, the invention provides a solution that allows these different communication networks to communicate effectively using both voice and data.

More specifically, these "first responder" organizations (e.g., the first governmental or similar agencies to render assistance to an accident or incident) need to enable interoperability in both data communications and voice communications systems. These different (and potentially incompatible) communication systems of the different agencies may not be able to communicate directly with one other. Therefore, the invention provides a technical and operational platform that supports data and voice interoperability, leveraging modern, web-enabled systems to provide interoperable data and Voice Over IP (VoIP) communications between such incompatible systems of the different agencies.

The present invention extends the IBM Mobile Messaging Global Directory, available from International Business Machines, Armonk, N.Y., USA (e.g., see U.S. patent application Ser. No. 10/037,425, U.S. Patent Publication 20030125022, which is incorporated herein by reference) to incorporate voice over Internet protocol (VoIP) technology within the same infrastructure. The invention provides the ability to support many of the same interoperability and incident management functions using a voice interface, voice-to-data and data-to-voice conversion capability, and discreet IP addressability for voice users. Thus, the invention extends the Global Directory capabilities (i.e., personalization, collaboration, security, incident coordination audit and recording) to voice. Additionally, functions such as instant messaging between a user on a data device and a user on a voice device are provided by the invention.

U.S. patent application Ser. No. 10/037,425, U.S. Patent Publication 200301250022 recites in part: "The invention translates the message from an addressing protocol used by the first agency to a protocol used by the second agency. The invention maintains a global directory of addresses of units within the first agency and the second agency. The invention provides the first agency and the second agency access to the global directory to obtain addresses of units within the global directory. The invention also produces a report of active units in the first agency and the second agency."

Figure 2:
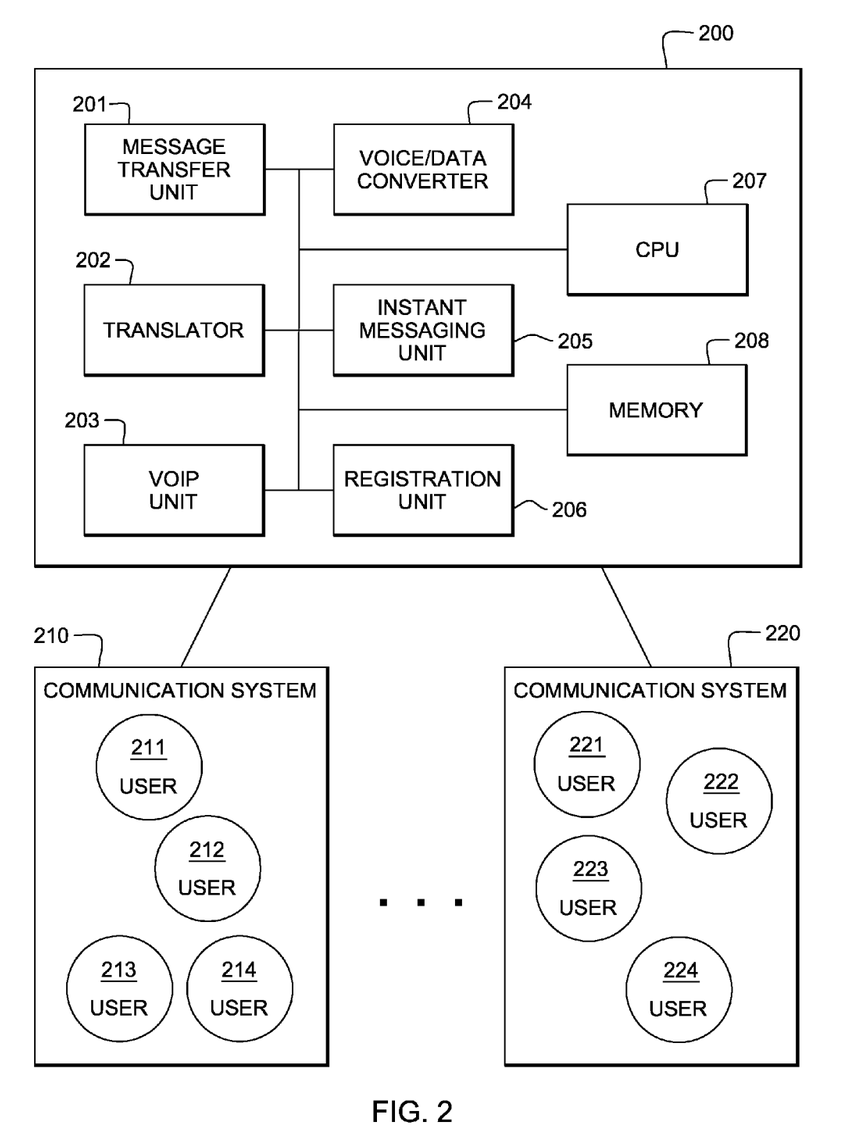
FIG. 2 is a schematic diagram of a system according to the invention.

U.S. patent application Ser. No. 10/037,425, U.S. Patent Publication 200301250022 also recites in part: "The inventive global directory, implemented on a "regional message server" 200, as shown in FIG. 2 below, provides a way for existing agencies to continue using their existing addressing schemes for local users, yet participate in the regional message server network. The inventive global directory may also be used by an officer in one agency to address a message to individuals in other agencies in situations requiring cooperation or assistance."

U.S. patent application Ser. No. 10/037,425, U.S. Patent Publication 200301250022further recites in part: "The regional message server 200 utilizes an addressing scheme based upon a hierarchical scheme. This permits each individual system's address scheme to remain intact, without modification. When messages are transmitted between different units 120, 121 within a given system, the messages are unaltered and operate according to that system's requirements. However, when messages are transmitted through the regional message server 200 to a unit in a different agency, additional information is added to the original message by the regional message server 200 that identifies the agency to which the message is directed."

U.S. patent application Ser. No. 10/037,425, U.S. Patent Publication 200301250022 yet further recites in part: "Therefore, the invention does not alter messages that are originated and delivered within a given agency. Thus, the invention does not require modification of the existing architecture of any given agency. Instead, the invention provides an additional communication channel that allows messages to be transferred easily and quickly between agencies. The only additional information required to transmit a message to a different agency is the proper regional address to identify the unit in the different agency For example, Agency A_s unit 1121 wants to send a message to Unit M351 in Agency B. First, 1121 must have a global address for Unit M351. When Unit 1121 sends the message to Agency A_s message switch, the message switch must have the logic to know it cannot deliver that message to a local device (due to the destination address being 'foreign' to Agency A) and it must put it on an outbound regional queue."

U.S. patent application Ser. No. 10/037,425, U.S. Patent Publication 200301250022 yet further recites in part: "The regional message server will receive the message on its inbound queue and look up the local Agency B address and associated outbound queue in the Global directory. The regional message server will substitute this local address for the global address in the message 'To:' field prior to putting it on the outbound queue. Agency $B_s$ message switch will then get the message from its inbound queue. Agency $B_s$ message switch will recognize the address as a local address and simply deliver the message to Unit M351. Since the recipient of a message may want to respond to the sender, note that, in the example Unit M351 receives the Global address from the sender as the source address. This allows one to easily respond to the sender."

The invention provides "first responder" interoperability. Interoperability, in a first responder situation, involves two distinct steps. The first step is a discovery step, where people or agencies identify incidents that require a response, and associate themselves, through their communication systems, with that incident. The second step is a mechanism to activate communication with other users related to the incident, using either voice or textual messages (as in instant messaging), or a combination of both.

The invention is very efficient and can utilize just one common infrastructure using a Global Directory and a web based application to perform the "discovery" process. Each first responder can select a mode of communication (i.e., textual message, voice or both) and then actually communicate from a variety of end user devices (laptops, hand helds, wireless, wired, etc.) with first responders using different communication systems/networks. The invention is not limited to any specific network for carrying the text or voice traffic. Therefore, the invention is applicable to many architecture, many management systems, many forms of user profiles, etc.

The present invention and the various features and advantageous details thereof are explained more fully with reference to the nonlimiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention. The examples used herein are intended merely to facilitate an understanding of ways in which the invention may be practiced and to further enable those of skill in the art to practice the invention. Accordingly, the examples should not be construed as limiting the scope of the invention.

Figure 1:
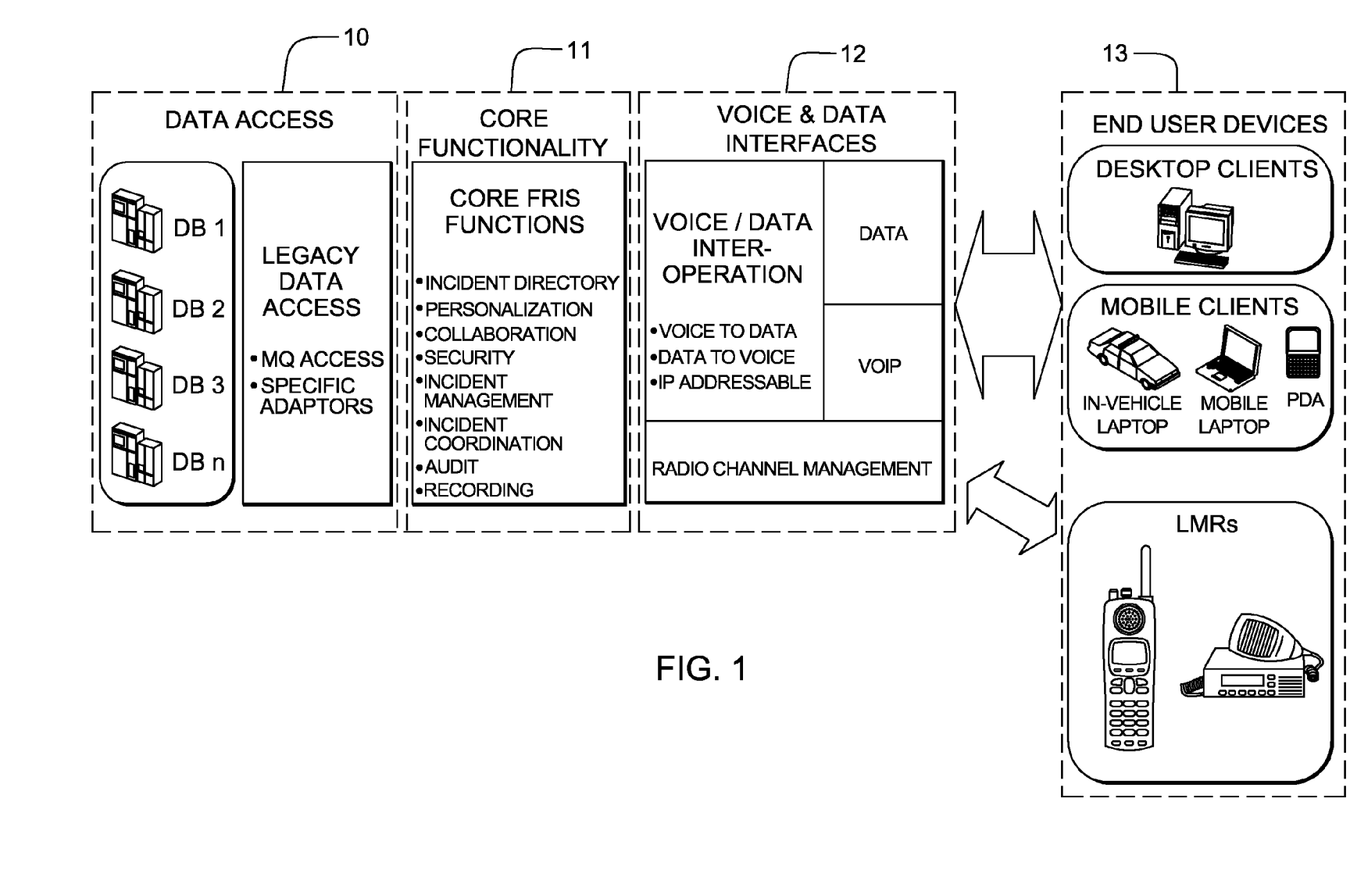
FIG. 1 is a schematic diagram of a system according to the invention.

One example of the invention is graphically depicted in FIG. 1. More specifically, item 10 shows the data access portion of the invention that includes a number of databases (DB1-DBn) and the legacy data access that uses specific adapters. The data access portion of the invention provides the capability to access and aggregate data from agency information systems/backend data sources. Specifically, the data access portion of the invention provides the following capabilities. The invention can access multiple back-end data sources/information systems for data retrieval, standardize data from multiple sources into well-defined sub-objects and fields, return data to the calling object in a standardized XML document, allow the addition of new data sources without affecting existing code, provide availability of data for subsequent queries for an existing session, and expire data objects and remove them from memory when no longer needed Standardized XML will be used when those standards exist for communication between components of the system and with external agencies.

Core functionality of the invention is shown as item 11 and includes functions such as incident directory, personalization, collaboration, security, incident management, incident coordination, recording, and audit. These functions are extensions of the IBM Mobile Messaging Global Directory.

The incident directory functions organize incidents for presentation and collaboration for the duration of an incident. From the time an incident is initially registered until the incident is closed, users of the system can view information about the incident, register themselves as members of the incident group, be registered as members of the incident group by an authorized user such as a dispatcher or incident commander, and interact by voice with other users in the incident individually or as a group.

The incident directory also provides the capability to trigger automated notifications based on the content of key fields in the incident directory. The personalization function allows users to maintain personal profiles including their identification data, organizational affiliations, roles, skills, and availability, and define incident and activity attributes that will trigger automatic notifications addressed to themselves or alerts addressed to predefined groups of users or all users.

The collaboration function enables users to communicate with one another and with groups in real-time through instant messaging and voice communications. This function also enables collaboration with users not immediately available through alerts, notifications, e-mails, and recorded voice messages. These capabilities utilize IP and VoIP technologies.

The security function is performed by implementation of security profiles for organizations, units within organizations, predefined user roles and individuals. Authentication and verification is implemented using user IDs and passwords. These security measures are in addition to communications security, database access control, encryption and hardware-based security utilized elsewhere in the system.

Incident management is implemented by associating an instant messaging session with each incident (Main Room). Through this function, users can self assign or be assigned individually or be assigned along with all members of a group to the Main Room representing the incident or to any number of rooms created within the main room on one or more levels to enable specialized teams to focus on assignments by an incident coordinator or commander. Incident activities can be managed from a variety of locations. Incident Management activities can be registered and shared with other organizations on a real-time basis and logged for reporting and evaluation purposes.

Incident Coordination is handled real-time using the instant messaging and notification features of the application. The ability to organize instant message chat dialogs into rooms and rooms within rooms, allows first responders to communicate with each other without the clutter of other incident-related activities. This feature, based upon IP and VoIP technologies provides the same focus of communications among those communicating via data and via voice. As these communications take place during an incident, the centralization of these communications provides a centralized incident coordination capability.

The query function provides an ability to inquire on a variety of information relevant to an incident contained in disparate systems. Connectivity to other agency applications and other agency databases as well as public and private data repositories, provides a virtual centralized query capability. Queries for data to support criminal inquiries, vehicle information, hazardous conditions and materials, building pre-plans, evacuation roots, building layouts are examples of types of supported queries.

The recording and audit function is provided by implementing a transaction journaling capability using the IP, VoIP and database technologies. All incident management activities, user communications and other user transactions are journaled in an activity repository. During an incident, this repository enables user playback of voice communications and scroll back of instant message and email communications to promote clarity and avoid unnecessary repetition of communications. This function also enables after action performance review and detailed audit capability.

Item 12 in FIG. 1 illustrates the voice and data interfaces including voice-to-data and data-to-voice which are IP addressable. Item 12 also illustrates the data channels, voice over Internet protocol channels and radio channel management. This portion of the invention provides data and VoIP channel management, interoperability between VoIP and data users, and interfaces to commercial-off-the-shelf (COTS) land mobile radio (LMR) bridging products. Specifically, this portion of the invention provides voice-to-data conversion, data-to-voice conversion, data channel management, VoIP channel management, interface for voice user control of COTS LMR bridging products, and interface for data user control of COTS LMR bridging products.

Item 13 illustrates the end user devices which can include desktop clients, mobile clients (in-vehicle laptops, mobile laptops, PDAs, etc.), as well as land mobile radios (LMRs) .user devices can include the following. However, those skilled in the art will recognize that other end user devices could also be used.

Desktop clients include any computing machines with network connectivity installed in a fixed environment utilizing browser-based technology or client software capable of supporting Internet protocols. Desktop clients require wired or wireless connectivity to the Internet or an intranet on which the invention application system coresides.

Mobile Clients are a category of portable computing machines utilizing browser-based technology or client software capable of supporting Internet protocols. Mobile clients are not physically connected to a network, but are connected via one or more pre-defined radio frequency communications modes. Mobile clients include in-vehicle laptops that communicate to a central location thru land mobile radio signals or other wireless communications modes such as CDPD, 1XRTT, EVDO, GPRS, Wi-Fi, Personal Digital Assistants (PDAs) and handheld computing devices that can connect to the Internet/intranet using Wi-Fi or LAN attached network such as Ethernet, and portable computing devices and other commercially available proprietary computing devices that can attach to the Internet or an intranet via wireless or LAN attached networks.

Land mobile radio systems include proprietary and non-proprietary radio systems, conventional and trunked, including software-enhanced wireless telephones, two-way radios and messaging products that utilize these technologies.

This approach provides a strategic direction for high-function VoIP interoperability capabilities. Additionally, the overall approach can integrate commercial-off-the-shelf (COTS) land mobile radio bridging products to provide a tactical solution for radio channel interoperability.

FIG. 2 illustrates the inventive communication server 200 that includes a message transfer unit 201 that transfers messages sent between a first user 212 communicating under a first communication system 210 and a second user 222 communicating under a second communication system 220. As shown in FIG. 2, the communication systems 210, 220 could each comprise a plurality of wired and wireless transceivers 211-214 and 221-224 that could be used by, for example, emergency-response organizations. These communication systems 210, 220 may be incapable of communicating directly with each other. While only two systems are illustrated, one ordinarily skilled in the art would understand that the communication server 200 could be connected to a large number of very diverse communication systems.

The communication server 200 also includes a translator 202 connected to the message transfer unit 201. The translator 202 translates messages sent from the first communication system 210 into a format compatible with the second communication system 220 and vice versa.

The communication server 200 also has a voice-over-Internet-protocol (VoIP) unit 203 connected to the message transfer unit 201, so that messages can be transmitted through the communication server 200 in a VoIP format. Messages are transferred between the communication systems 210, 220 using discrete Internet protocol addresses.

A voice/data converter 204 can be included with the communication server 200. The voice/data converter 204 is used to convert voice messages into data messages and data messages into voice messages. Thus, with the invention, a voice user in the first communication system 210 may transparently communicate with a data user in the same or a second communication system 220 (and vice versa) through the communication server 200. Additionally, the communication server 200 can provide an instant message unit 205 that allows instant messaging between the communication systems.

The communication server 200 can include a registration unit 206 that associates users with an incident. This allows the invention to restrict communications between the users by incident and by registration. Therefore, the invention only transfers messages between users who have registered for an incident. Further, the invention can maintain many incidents simultaneously and users are permitted to register for multiple simultaneous incidents.

Thus, for a user to be able to send and receive voice or data messages related to a specific incident, the user must register for that incident with the communication server 200.

The communication server 200 can also include a central processing unit 207 and a memory 208 for processing information between the units, performing mathematical calculations, storing information (such as user's incident registrations, etc.) temporarily or permanently, etc. All the devices are interconnected with one another by a common bus system or other similar electrical connections.

Figure 3:
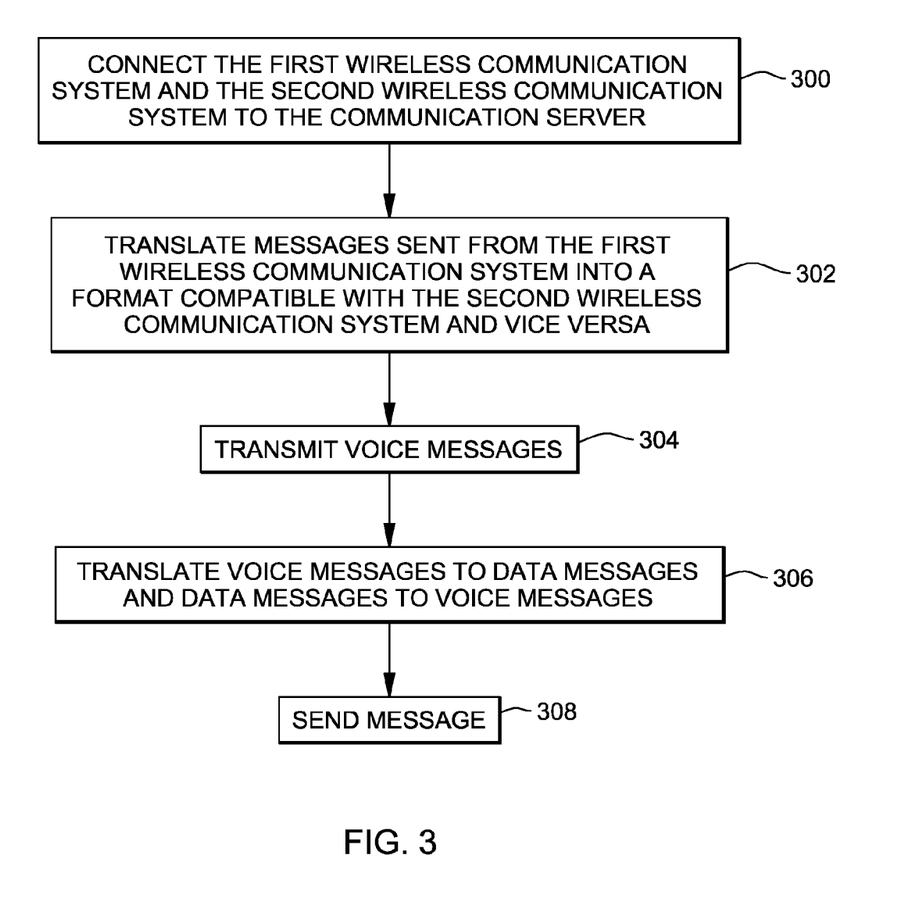
FIG. 3 is a flow diagram illustrating a preferred method of the invention.

As shown in flowchart form in FIG. 3, the invention presents a method of providing communications between different communication systems. As shown in item 300, the invention connects the first communication system 210 and the second communication system 220 to the communication server 200 and translates messages sent from the first communication system 210 into a format compatible with the second communication system 220 and vice versa (item 302), using the communication server 200. Again, the invention transmits voice messages (item 304) between the first communications system and the second communications system through the communication server 200 in a voice-over-Internet-protocol VoIP format using discrete Internet protocol addresses.

The invention can translate voice messages to data messages and data messages to voice messages (item 306). Thus, as explained above, a voice user in a first communication system 210 may transparently communicate with a data user in the same or a second communication system 220 through the communication server 200. The invention can also send instant messaging between the first communication system 210 and the second communication system 220 (item 308) so as to provide real-time communication between users of the different communication systems.

Figure 4:
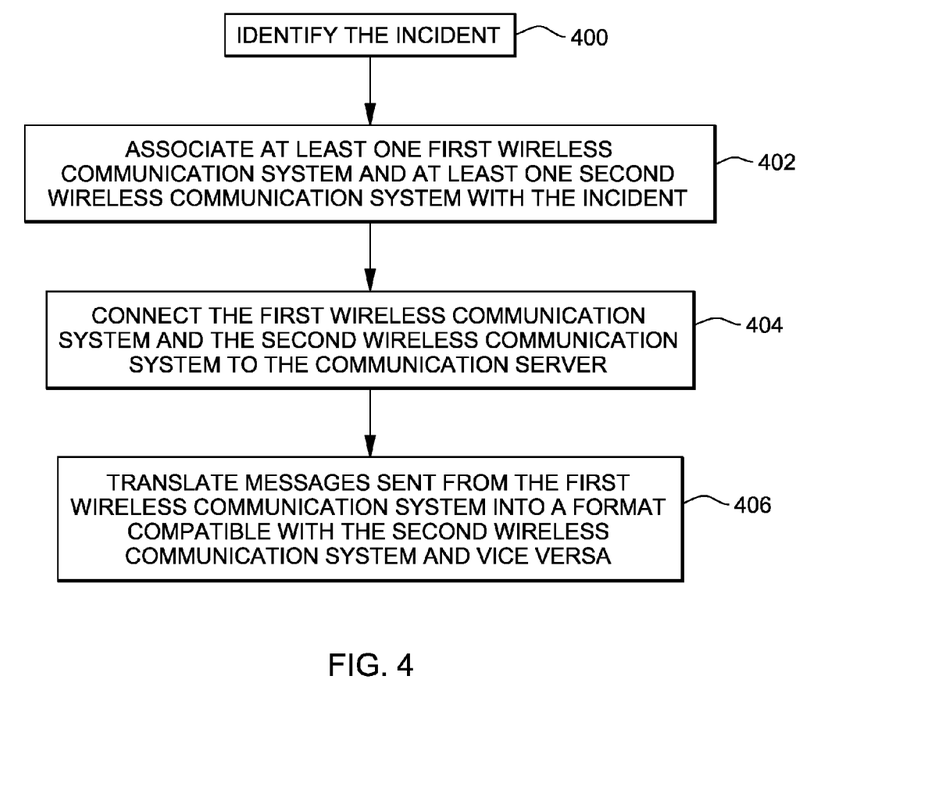
FIG. 4 is a flow diagram illustrating a preferred method of the invention.

As shown in the flowchart in FIG. 4, the invention can restrict communications between users of incompatible communication systems by incident and depending upon those users who have associated themselves with a specific incident. In such a situation, the invention first identifies the incident (item 400) and then associates at least one user of a first communication system 210 and at least one user of a second communication system 220 with the incident (item 402). Then, the invention connects the first communication system 210 and the second communication system 220 to the communication server 200 (item 404) and translates messages sent from the first communication system 210 into a format compatible with the second communication system 220 and vice versa (item 406).

Users of the invention will obtain the following benefits. The invention achieves communications between existing incompatible communication systems without discarding or significantly altering the existing systems. Also, the invention enables communications sessions between data users, VoIP communication users, and users of client types including land-line telephone, cell phone, and land mobile radio. Further, the invention enables incident response communication teams, with members from agencies that use incompatible communication systems. The multi-agency teams can be created by shift, geographic location, discipline, special skill, and other parameters. Additionally, the invention enables a user to identify and communicate with users from other agencies for specific purposes and enables a user to identify and communicate with users from other agencies about specific incidents. The invention enables a user to identify and communicate with users based on unique user search criteria, i.e. shift, geographic location, discipline, special skill, and other parameters. As shown above, the invention enables the mixing of VoIP and data users simultaneously in the same communication session, i.e. instant messaging and voice-to-text, and enables event-driven invocation of a communication session, combining data and voice users.

Other applications and environments that would benefit from the invention include commercial environments involving users of multiple, disparate communication systems (i.e. package delivery services); major event management environments (i.e. major sports events, large concernts) involving multiple entities responsible for event logistics as well as safety, where the multiple entities use disparate communication systems; and any similar environment involving multiple entities with a need to communication, where the entities use incompatible communication systems.

What is claimed is:

1. An interoperable data and voice communication system that supports simultaneous, multi-party communication between incompatible communication systems, said interoperable data and voice communication system comprising:
    a first communication system that communicates with first users by a first addressing scheme and a first communication format for any of data and voice, each of said first users having a first unique Internet Protocol (IP) address;
    a second communication system that communicates with second users by a second addressing scheme and a second communication format for any of data and voice, each of said second users having a second unique Internet Protocol (IP) address; and
    an interoperable communication server, comprising:
        a message transfer unit that transfers any of data and voice messages between a first user at said first unique IP address and a second user at said second unique IP address;
            wherein said first addressing scheme is incompatible with said second addressing scheme; and
            wherein a global directory, using a common hierarchical addressing scheme for said first unique IP address and said second unique IP address, connects a first user at said first unique IP address to a second user at said second unique IP address;
        a translator connected to said message transfer unit, said translator translating any of data and voice messages sent from said first communication system into said second communication format compatible with said second communication system and from said second communication system into said first communication format compatible with said first communication system;
        a voice/data converter that converts voice messages into data messages and data messages into voice messages; and
        a voice-over-Internet-protocol (VoIP) unit connected to said message transfer unit, wherein said voice messages transmitted through said interoperable communication server are converted to a VoIP format.

2. The interoperable communication server in claim 1, further comprising an instant message unit that instant messages between said first communication system and said second communication system.

3. The interoperable communication server in claim 1, further comprising a registration unit that registers said first users and said second users with an incident and restricts communication to said first users and said second users upon registration with said incident.

4. The communication server in claim 1, all the limitations of which are incorporated herein by reference, wherein said first communication system and said second communication system each comprise any of a plurality of mobile wireless transceivers and a plurality of land-based transceivers used by emergency-response organizations.

5. An interoperable data and voice communication system that supports simultaneous, multi-party communication between incompatible communication systems, said interoperable data and voice communication system comprising:
    a first communication system that communicates with first users by a first addressing scheme and a first communication format for any of data and voice, each of said first users having a first unique Internet Protocol (IP) address;
    a second communication system that communicates with second users by a second addressing scheme and a second communication format for any of data and voice, each of said second users having a second unique Internet Protocol (IP) address; and
    an interoperable communication server, comprising:
        a message transfer unit that transfers any of data and voice messages between a first user at said first unique IP address and a second user at said second unique IP address;
            wherein said first addressing scheme is incompatible with said second addressing scheme; and
            wherein a global directory, using a common hierarchical addressing scheme for said first unique IP address and said second unique IP address, connects a first user at said first unique IP address to a second user at said second unique IP address;
        a translator connected to said message transfer unit, said translator translating any of data and voice messages sent from said first communication system into said second communication format compatible with said second communication system and from said second communication system into said communication format compatible with said first communication system; and
        a voice/data converter that converts voice messages into data messages and data messages into voice messages.

6. The interoperable communication server in claim 5, further comprising a a registration unit that registers said first users and said second users with an incident and restricts communication to said first users and said second users upon registration with said incident.

7. The interoperable communication server in claim 5, further comprising an instant message unit that instant messages between said first communication system and said second communication system.

8. The interoperable communication server in claim 5, further comprising a voice-over-Internet-protocol (VoIP) unit connected to said message transfer unit, wherein said voice messages transmitted through said interoperable communication server are converted to a VoIP format.

9. The interoperable communication server in claim 5, wherein said first communication system and said second communication system each comprise any of a plurality of mobile wireless transceivers and a plurality of land-based transceivers used by emergency-response organizations.

10. The interoperable communication server in claim 5, wherein said message transfer unit transfers any of said data and voice messages to provide real-time communication between said first users and said second users of.

11. An interoperable communication server comprising:
    a message transfer unit that transfers any of data and voice messages between first users of a first communication system and second users of a second communication system;
        wherein said first communication system communicates with said first users by a first addressing scheme and a first communication format for any of data and voice, each of said first users having a first unique Internet Protocol (IP) address;
        wherein said second communication system communicates with said second users by a second addressing scheme and a second communication format for any of data and voice, each of said second users having a second unique IP address;

wherein said first addressing scheme is incompatible with said second addressing scheme; and wherein a global directory, using a common hierarchical addressing scheme for said first unique IP address and said second unique IP address, connects a first user at said first unique IP address to a second user at said second unique IP address;

a translator connected to said message transfer unit, said translator translating any of data and voice messages sent from said first communication system into a second communication format compatible with said second communication system and from said second communication system into said first communication format compatible with said first communication system; and a voice/data converter that converts voice messages into data messages and data messages into voice messages.

12. The communication server in claim 11, all the limitations of which are incorporated herein by reference, further comprising an instant message unit that instant messages between said first communication system and said second communication system.

13. The interoperable communication server in claim 11, further comprising a registration unit that registers said first users and said second users with an incident and restricts communication to said first users and said second users upon registration with said incident.

14. The communication server in claim 11, all the limitations of which are incorporated herein by reference, wherein said first communication system and said second communication system each comprise any of a plurality of mobile wireless transceivers and a plurality of land-based transceivers used by emergency-response organizations.

15. The communication server in claim 11, all the limitations of which are incorporated herein by reference, wherein said message transfer unit transfers any of said data and voice messages to provide real-time communication between said first users and said second users.

16. A method of providing interoperable data and voice communications that supports simultaneous, multi-party communications between incompatible communication systems, said method comprising:

transferring any of data and voice messages between first users of a first communication system and second users of a second communication system via an interoperable communication server, wherein said first communication system communicates with said first users by a first addressing scheme and a first communication format for any of data and voice, each of said first users having a first unique Internet Protocol (IP) address;

wherein said second communication system communicates with said second users by a second addressing scheme and a second communication format for any of data and voice, each of said second users having a second unique IP address;

wherein said first addressing scheme is incompatible with said second addressing scheme; and wherein a global directory, using a common hierarchical addressing scheme for said first unique IP address and said second unique IP address, connects a first user at said first unique IP address to a second user at said second unique IP address;

translating any of data and voice messages sent from said first communication system into said second communication format compatible with said second communication system and from said second communication system into said first communication format compatible with said first communication system, using said interoperable communication server;

converting voice messages into data messages and data messages into voice messages, using said interoperable communication server; and converting voice messages transmitted through said interoperable communication server, to a voice-over-Internet-protocol (VoIP) format.

17. The method in claim 16, further comprising sending instant messages between said first communication system and said second communication system.

18. The method in claim 16, wherein said first communication system and said second communication system each comprise any of a plurality of mobile wireless transceivers and a plurality of land-based transceivers used by emergency-response organizations.

19. The method in claim 16, wherein said transferring any of data and voice messages between first users of a first communication system and second users of a second communication system provides real-time communication between said first users and said second users.

20. A method of providing interoperable data and voice communications that supports simultaneous, multi-party communications between incompatible communication systems of different emergency response agencies, said method comprising:

identifying an incident;

associating a first communication system with said incident;

associating a second communication system with said incident;

transferring any of data and voice messages between first users of said first communication system and second users of said second communication system via an interoperable communication server wherein said first communication system communicates with said first users by a first addressing scheme and a first communication format for any of data and voice, each of said first users having a first unique Internet Protocol (IP) address;

wherein said second communication system communicates with said second users by a second addressing scheme and a second communication format for any of data and voice, each of said second users having a second unique IP address;

wherein said first addressing scheme is incompatible with said second addressing scheme; and wherein a global directory, using a common hierarchical addressing scheme for said first unique IP address and said second unique IP address, connects a first user at said first unique IP address to a second user at said second unique IP address;

translating any of data and voice messages sent from said first communication system into said second communication format compatible with said second communication system and from said second communication system into said first communication format compatible with said first communication system, using said interoperable communication server;

converting voice messages into data messages and data messages into voice messages, using said interoperable communication server; and restricting communications between said first communication system and said second communication system to said incident.

21. The method in claim 20, further comprising sending instant messages between said first communication system and said second communication system.

22. The method in claim 20, wherein said first communication system and said second communication system each comprise any of a plurality of mobile wireless transceivers and a plurality of land-based transceivers used by emergency-response organizations.

23. The method in claim 20, transferring any of data and voice messages between first users of a first communication system and second users of a second communication system provides real-time communication between said first users and said second users.

24. A method of providing interoperable data and voice communications that supports simultaneous, multi-party communications between incompatible communication systems, said method comprising:
   transferring any of data and voice messages between first users of a first communication system and second users of a second communication system via an interoperable communication server;
   wherein said first communication system communicates with said first users by a first addressing scheme and a first communication format for any of data and voice, each of said first users having a first unique Internet Protocol (IP) address;
   wherein said second communication system communicates with said second users by a second addressing scheme and a second communication format for any of data and voice, each of said second users having a second unique IP address;
   wherein said first addressing scheme is incompatible with said second addressing scheme; and
   wherein a global directory, using a common hierarchical addressing scheme for said first unique IP address and said second unique IP address, connects a first user at said first unique IP address to a second user at said second unique IP address;
   translating any of data and voice messages sent from said first communication system into said second communication format compatible with said second communication system and from said second communication system into said first communication format compatible with said first communication system, using said interoperable communication server; and
   converting voice messages into data messages and data messages into voice messages, using said interoperable communication server.

25. The method in claim 24, further comprising sending instant messages between said first communication system and said second communication system.

26. The method in claim 24, wherein said first communication system and said second communication system each comprise any of a plurality of mobile wireless transceivers and a plurality of land-based transceivers used by emergency-response organizations.

27. The method in claim 24, wherein transferring any of data and voice messages between first users of a first communication system and second users of a second communication system provides real-time communication between said first users and said second users.

* * * * *